United States Patent [19]

Holzhauser

[11] 4,345,751
[45] Aug. 24, 1982

[54] SHEET FEEDING APPARATUS

[75] Inventor: Ronald C. Holzhauser, Holley, N.Y.

[73] Assignee: Eastman Kodak Company, Rochester, N.Y.

[21] Appl. No.: 172,339

[22] Filed: Jul. 25, 1980

[51] Int. Cl.³ ............................................. B65H 5/22
[52] U.S. Cl. .................................. 271/3.1; 271/12; 271/100; 271/107; 271/233; 271/301
[58] Field of Search .................... 271/3.1, 12, 13, 35, 271/112, 118, 100, 101, 106, 107, 233, 197, 301

[56] References Cited

U.S. PATENT DOCUMENTS

| | | |
|---|---|---|
| 27,976 | 4/1879 | Sahley . |
| Re. 29,178 | 4/1977 | Colwill ............................. 271/3.1 X |
| 2,770,458 | 11/1956 | Halahan et al. |
| 3,575,507 | 4/1971 | Varson et al. |
| 3,674,255 | 7/1972 | Arnell ................................ 271/100 |
| 3,698,706 | 10/1972 | Mihojevich . |
| 3,819,175 | 6/1974 | Borostyan ..................... 271/197 X |
| 3,984,099 | 10/1976 | McCrea . |
| 4,033,694 | 7/1977 | Ferrari . |
| 4,043,669 | 8/1977 | Gebatia . |
| 4,047,812 | 9/1977 | Hogan . |
| 4,052,128 | 10/1977 | Burton et al. |
| 4,066,252 | 1/1978 | Wick . |
| 4,076,408 | 2/1978 | Reid . |
| 4,078,787 | 3/1978 | Burlew . |
| 4,169,674 | 10/1979 | Russel . |
| 4,176,945 | 12/1979 | Holzhauser . |
| 4,184,670 | 1/1980 | Rosendahl ............................. 271/12 |
| 4,213,604 | 7/1980 | Sato ................................... 271/233 |
| 4,247,095 | 1/1981 | May ................................... 271/233 |

FOREIGN PATENT DOCUMENTS 1411550 10/1975 United Kingdom .

OTHER PUBLICATIONS

I.B.M. Tech. Discl. Bulletin, vol. 14, No. 5, p. 1547, vol. 19, No. 12, p. 4496.
Research Disclosure No. 17351, pp. 44-48, vol. 173 (Sep. 1978 Ed.).

Primary Examiner—Richard A. Schacher
Attorney, Agent, or Firm—G. Herman Childress

[57] ABSTRACT

Document sheets are removed seriatim from the bottom of a stack of sheets by an oscillating vacuum feeder having a plurality of spaced tube sections. The feeder delivers a removed sheet to a sheet transport mechanism, which transports it to the platen for copying and then removes the sheet from the platen. The sheet transport mechanism has at least one vacuum belt that passes between two adjacent sections of the feeder and picks up a sheet as it leaves the feeder so that the sheet is tacked to the feeder or the vacuum belt throughout its path of travel from the stack of sheets to the platen. After the sheet is removed from the platen it is returned to the stack of sheets on top of other sheets in the stack. A sheet inverter can be provided for inverting duplex document sheets so that both sides of such sheets can be copied. Sheets also can be fed to the platen along a non-recirculating path by a document positioner apparatus. Sheets fed by the document positioner also are advanced across the platen by the vacuum belt.

13 Claims, 14 Drawing Figures

SHEET FEEDING APPARATUS

BACKGROUND OF THE INVENTION

This invention relates generally to sheet feeders and, more specifically, to a combination recirculating document feeder and document positioner.

It is known in the art to provide a copier with a document feeder that presents a set of document sheets seriatim to an exposure station of the copier to produce one or more collated sets of copies without the need for a collator. Such apparatus is disclosed in the commonly assigned U.S. Reissue Pat. No. Re. 27,976 and in the commonly assigned U.S. Pat. No. 4,169,674, which issued on Oct. 2, 1979 in the name of Matthew J. Russel and is entitled RECIRCULATING SHEET FEEDER. In the document feeder disclosed in U.S. Pat. No. 4,169,674, a set of document sheets are stacked in a tray and removed seriatim, beginning with the bottom sheet in the tray, by an oscillating vacuum feeder. A removed sheet is inverted once and fed to a platen where the document sheet is registered and exposed once to produce a copy of the sheet. Then the sheet is inverted a second time and returned to the stack of sheets in the tray on top of other sheets in the tray. This process continues until all the sheets in the set of document sheets have been copied one or more times. The copy sheets are fed, one after another, into a stack in a tray with the first copy sheet being at the bottom and other copy sheets being received seriatim on top of previously delivered copy sheets. The information copied faces upwardly on each copy sheet and the resulting copy sets are arranged in the same page sequence order as the set of document sheets. Similar recirculating feeder apparatus is described in commonly assigned U.S. Pat. Nos. 4,076,408 and 4,078,787.

It is also known to provide document feeder apparatus wherein either simplex or duplex document sheets can be fed to a platen for copying in a recirculating feeder and to provide, in combination therewith, a document positioner useful for feeding one or more document sheets to the platen for copying one or more times, and then removing such sheets from the platen along a nonrecirculating sheet path. Such apparatus is disclosed in the commonly assigned U.S. Pat. No. 4,176,945 which issued on Dec. 4, 1979 in the names of R. C. Holzhauser et al, and is entitled SHEET FEEDING APPARATUS FOR USE WITH COPIER/DUPLICATORS OR THE LIKE, and in a related publication appearing as item No. 17351 on pages 44-48 of Volume 173 (September 1978 Edition) of Research Disclosure, such being available from Industrial Opportunities, Ltd., Homewell, Avant, Hampshire, P.O. 9-1EF, United Kingdom.

It is known to use oscillating vacuum tubes or cylinders for feeding sheets of paper from a stack of sheets. For example, the paper feeder disclosed in Halahan et al U.S. Pat. No. 2,770,458 includes an oscillating vacuum cylinder having three coaxial sections located beneath a stack of sheets. A pair of bearings is located at the ends of the center section of the cylinder and drive belts are trained around the bearings. The bearings are located relative to the vacuum cylinder so that the belts are recessed below the surface of the cylinder sections directly beneath the stack of sheets but project above the surface of the cylinder sections at a point spaced about 60° from the stack of sheets. The cylinder sections can remove a sheet from the stack and advance the sheet to a position where it contacts the drive belts. At that point, nip rollers urge the sheet against the drive belts for advancement by the belts.

In copier/duplicators it is common practice to register document sheets at a side or corner of a platen for exposure. Accordingly, document feeding apparatus of the type mentioned hereinbefore typically moves the document sheet across the platen toward such a registration edge or corner. A gate mechanism located at the registration position is engaged by the document sheet to locate the sheet in position for exposure. As disclosed in U.S. Pat. Nos. 4,076,408, 4,078,787 and 4,169,674, the document sheet continues to be driven against the gate mechanism after initial contact between the document sheet and the gate mechanism to correct any skew in the sheet. Also, sheet registration can be achieved by driving a sheet feeding roller mechanism a given number of revolutions to advance a document page across a copier platen to a registration edge at the far side of the platen. The latter type of registration is disclosed in the beforementioned Reissue Patent No. Re. 27,976.

The use of drive rollers to advance document sheets can cause the sheets to become skewed. Skewing is less pronounced when vacuum belts are used for advancing sheets. The use of vacuum belts for advancing sheets is disclosed in a number of publications, including item No. 15,056, which appears at pages 47 and 48 of the October, 1976 Edition of Research Disclosure, and in U.S. Pat. Nos. 3,984,099, 4,033,694, 4,043,669 and 4,047,812. In addition, U.S. Pat. No. 3,698,706 illustrates a vacuum belt system for photoconductive copy sheets wherein a sheet sensor is used to stop a drive to the belts and to simultaneously brake the belts, thereby to instantly stop the belts at the position required for projection of an image onto the desired portion of the copy sheet. Also, British Pat. No. 1,411,550 teaches the use of sheet sensors to stop a document sheet at a registration position for copying of the sheet.

In some cases it is desirable to invert a document or copy sheet. For example, a duplex document sheet has information on both sides that is to be copied. First one side of the document sheet is exposed for copying, then it is inverted and the second side of the sheet is exposed for copying. IBM Technical Disclosure Bulletin, Volume 14, No. 5, page 1547 discloses a sheet inverting apparatus wherein a sheet is driven around a roller to invert it. Other sheet inverting apparatus are disclosed in IBM Technical Disclosure Bulletin, Volume 19, No. 12, page 4496 and in U.S. Pat. Nos. 3,575,507, 4,052,128 and 4,066,252.

In some prior devices drive rollers used for advancing sheets may induce skewing of the sheets. Also the sheets may have to travel along relatively long paths leading to a registration position on a platen, and this increases the likelihood of sheets becoming skewed and increases the time required for delivery of a sheet to the registration position. Mechanical registration devices, such as bars or feet, frequently are used to register a sheet on the platen. Apparatus is required for moving these feet into and out of a position where they can register sheets, and sometimes images of these feet or bars are formed on copy sheets.

SUMMARY OF THE INVENTION

In accordance with the present invention document sheets are removed seriatim from a stack of sheets, delivered to a platen and stopped with an edge of the sheet at a registration point for copying of the sheet, and then returned to the stack of sheets. The sheets are removed from the stack by sheet removing means preferably comprising an oscillating vacuum feeder having a plurality of tube sections. The feeder delivers a removed sheet to a sheet transport mechanism, which transports it to the platen for copying and then removes the sheet from the platen. The sheet transport has at least one vacuum belt that passes between two sections of the feeder and picks up a sheet as it leaves the feeder so that the sheet is tacked to the feeder or the vacuum belt throughout its path from the stack of sheets to the platen.

BRIEF DESCRIPTION OF THE DRAWINGS

In the detailed description of the preferred embodiments of the invention presented below reference is made to the accompanying drawings, in which.

DETAILED DESCRIPTION OF THE PREFERRED EMBODIMENTS

Figure 1:
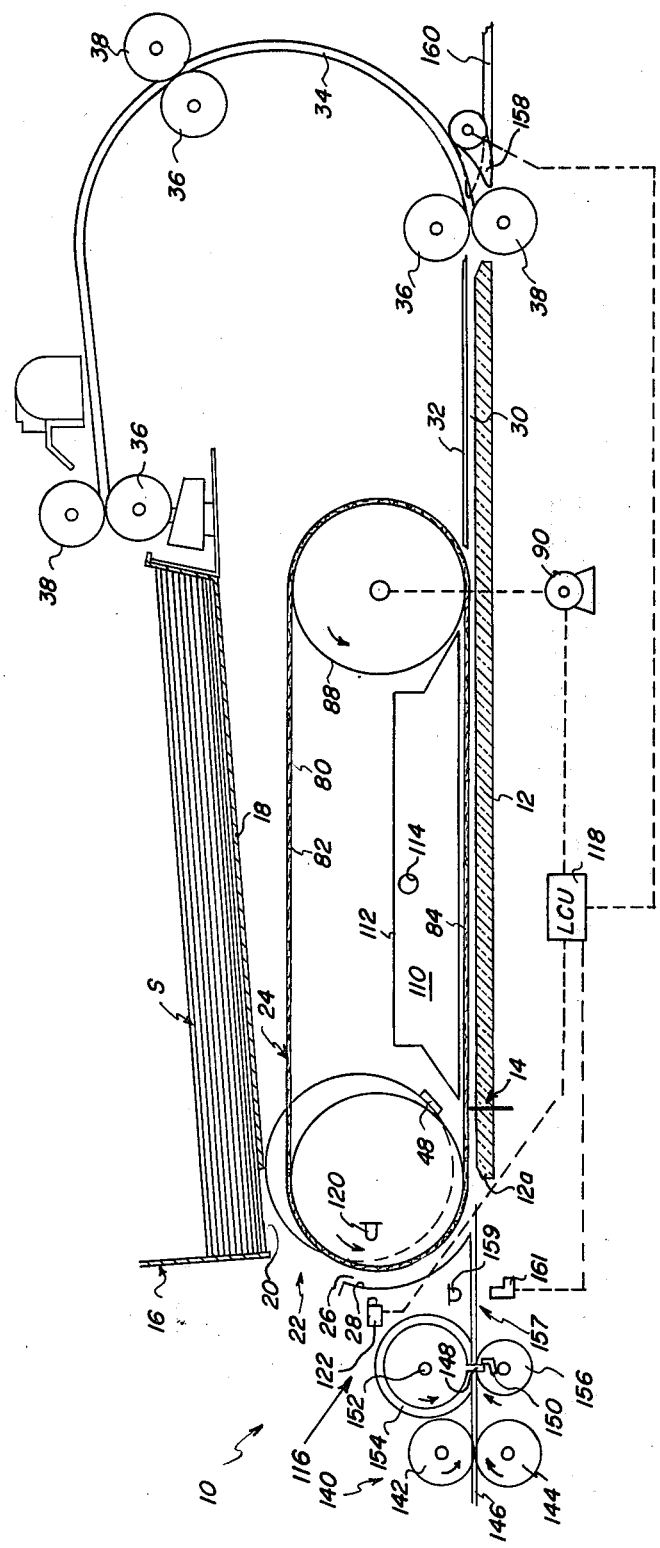
FIG. 1 is a schematic elevation view, partially in cross-section, illustrating a simplex sheet feeding apparatus of this invention.

Referring now to FIG. 1 of the drawings, sheet feeding apparatus of the present invention is generally designated 10 and, for purposes of illustration, will be described in connection with the feeding of simplex document sheets S to a platen 12. A "simplex document sheet" is a sheet having information to be copied on only one side or face of the sheet. The platen 12 comprises part of a document copying apparatus, such as a copier/duplicator of the type disclosed in more detail in the beforementioned commonly assigned U.S. Pat. Nos. 4,076,408, 4,078,787 and 4,169,674. When the sheet S has been delivered to platen 12 it is located at a registration position on the platen for copying. The sheet, when in the registration position, has one of its edges located along a line shown at 14 in the drawings. Line 14 is adjacent and generally parallel to one edge 12a of the platen. When the sheet is thus registered on the platen it is exposed by flash lamps (not shown) to produce an image of the document sheet on a photoconductor. That image is then processed and transferred to a copy sheet by suitable electrophotographic apparatus, for example.

A tray 16 is located above the platen 12 and is adapted to receive and hold a stack of document sheets S that are to be copied. Tray 16 has a bottom 18 which supports the sheets, and there is an opening 20 in the tray bottom through which sheets are removed seriatim, beginning with the bottommost sheet in the stack, and delivered to the platen 12 for copying. Preferably the bottom 18 of the tray is sloped downwardly toward the opening 20 so that the sheets are urged toward the left wall of the tray (as viewed in FIG. 1) by gravity. In addition, side joggers and end joggers (not shown) can be provided for aligning the document sheets and urging them against the left wall of the tray. Sheets S are placed in the tray in their normal page sequence order with the top sheet being the first page of the document and with the bottom sheet comprising the last page of the document. The information to be copied on each document sheet faces upwardly in the tray. As the sheets are removed from the bottom of the stack in tray 16 the last document page or sheet is removed first and the first document page or sheet is removed last.

Sheet removing means 22 is located adjacent the opening 20 in the bottom of the tray and is effective to remove from the tray the bottommost sheet S in the tray and to feed it to a sheet transport mechanism generally designated 24. Mechanism 24 delivers the document sheet removed from the tray to the platen 12 so that it can be exposed and copied. Mechanism 24 advances the sheet across the platen in a left-to-right direction, i.e., in a direction extending away from edge 12a of the platen so that the trailing edge of the sheet reaches edge 12a of the platen after the leading edge. In the process of removing a sheet from the tray and delivering it to the platen 12 the sheet is fed through a guide path 26 defined by the sheet removing means 22, the sheet transport mechanism 24 and a sheet guide 28. A sheet traveling from tray 16 to the platen 12 is inverted once prior to being copied so that the upper face of the sheet in the tray 16 faces downwardly on platen 12 for copying.

As the sheet is driven onto the platen by the sheet transport mechanism 24, it enters a slot 30. The slot is located above the platen and below mechanism 24 and a backing plate 32. After the sheet has been copied, it is delivered into an inverting sheet path 34. Transport of the sheet through the path 34 is effected by pairs of drive rollers 36 and idler rollers 38. When the sheet reaches the upper end of path 34, it is directed into the tray 16 on top of any other sheets that remain in the tray. The direction taken by the sheet as it leaves path 34 is determined, in part, by the relationship between the last pair of rollers 36, 38. Thus the sheet is directed downwardly into the tray by locating the axis of roller 36 slightly to the right of a vertical plane through the axis of roller 38. It is apparent from the foregoing description that the document sheet is inverted twice in the process of being removed from the bottom of the tray, delivered to the platen and then returned to the tray. Because the sheet is inverted an even number of times, the same side of the sheet faces upwardly in the tray before its removal for copying and after it is returned to the tray.

Referring to FIGS. 2–5 and 7, the sheet removing means 22 comprises an oscillating vacuum tube (OVF) generally designated 40. Tube 40 has three axially-aligned tubular sections 42, 44 and 46 that are connected together for conjoint movement by a tie-bar 48. The tie-bar preferably is made of a spring steel material in order to compensate for any irregularities in the shape of the three tube sections 42, 44 and 46, and to allow some slight deviation in the conjoint rotation of these sections. A rotational movement applied to any of these tube sections is imparted to the other tube sections through the tie-bar 48. The tube can be oscillated in any suitable manner, such as conventionally done in connection with prior oscillating vacuum tube feeders.

Tube sections 42, 44 and 46 are cylindrical members having the same diameter. Tube sections 42 and 46 are essentially the mirror image of each other and are similar to, but slightly different from, the construction of tube section 44. The differences are primarily in the arrangement of the ports and the provision of an opening in section 42 for radiation from an emitter, as discussed later. Sections 42 and 46 are rotatable about plastic sleeves 50, and section 44 is rotatable about plastic sleeve 52. Sleeves 50 are the mirror image of each other, and the sleeves 50, 52 differ primarily in the arrangement of the slots in the sleeves and the provision of an opening in one of the sleeves 50 for radiation from an emitter, as discussed later. Each sleeve has a cylindrical outer surface.

Figure 2:
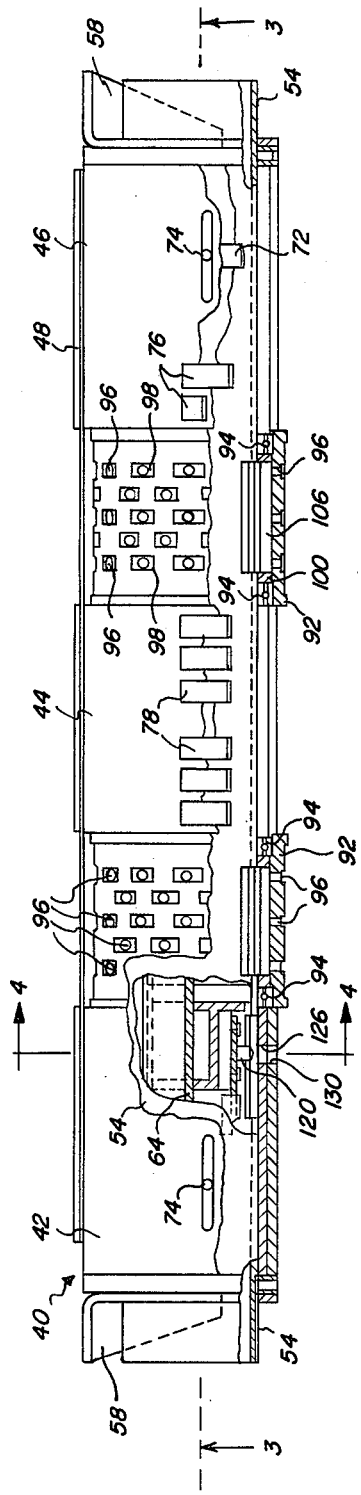
FIG. 2 is a plan view, partially broken away, illustrating the oscillating vaccum tube and a portion of the vacuum belt sheet transport of the FIG. 1 apparatus.
Figure 5:
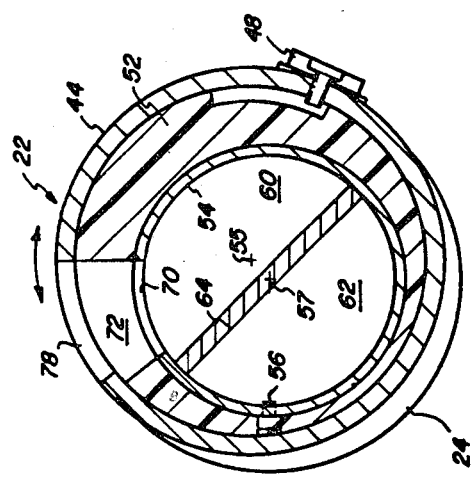
Figure 4:
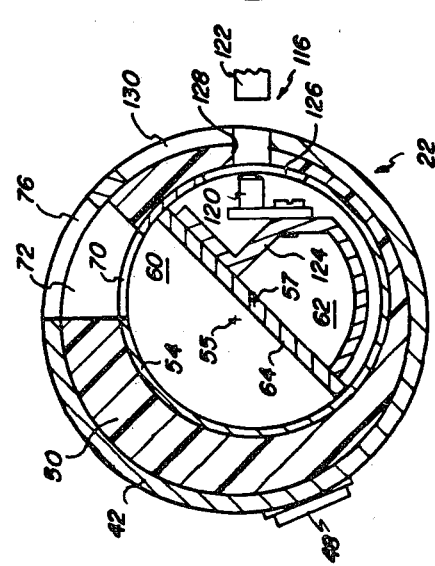
Figure 7:
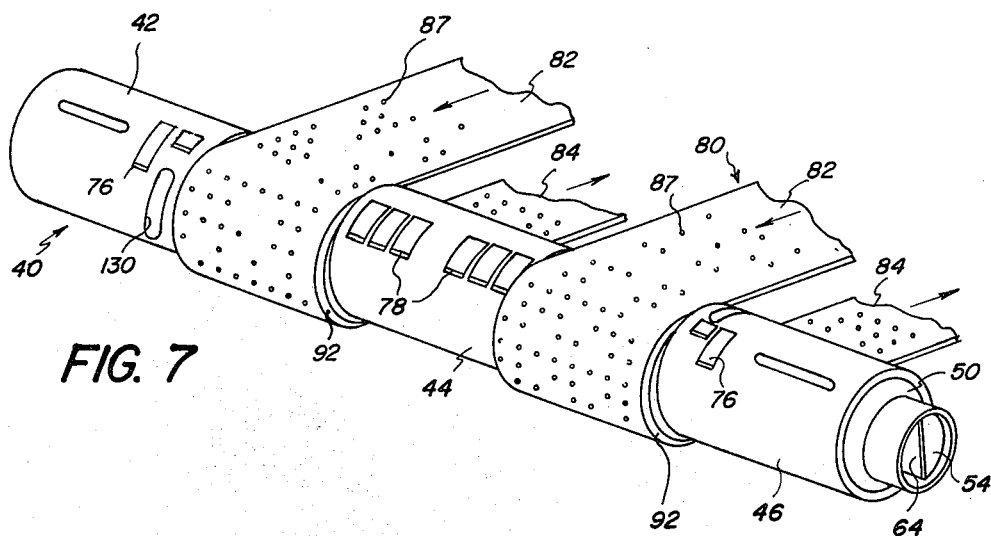
FIG. 7 is a fragmentary perspective showing portions of the oscillating vacuum feeder and the sheet transport.

Referring to FIGS. 4 and 5, sleeves 50, 52 have eccentric cylindrical openings therethrough, and the sleeves fit around and are connected to a central support tube 54. Due to this mounting, the tube sections rotate about an axis 55 that is offset above and to the right (as viewed in FIG. 5) from the axis 57 of tube 54. The sleeves can be secured to the tube in any suitable manner, such as by a set screw 56 shown in FIG. 5. As shown in FIG. 2, mounting members 58 are provided at opposite ends of tube 54. The mounting members 58 can be secured to a suitable support (not shown) to thereby support the tube 54 and the oscillating vacuum tube. The mounting member can also serve to orient the tube 54 relative to opening 20 in the tray 16.

Tube 54 is hollow and is separated into two discrete semicylindrical passages 60 and 62 by a partition 64 that is positioned within and extends the length of the tube 54. A plate 66 in the right end of tube 54 closes the passage 60 at the right end of the tube (as viewed in FIG. 3). The plate 66 is located at the front end of the feeder, as viewed in FIG. 1. A similar plate 68 closes the opposite or left end of the passage 62. The open ends of the passages 60 and 62 are connected by conventional means (not shown) to two vacuum supplies. Passages 60 and 62 are used for connecting the sheet removing means 22 and the sheet transport mechanism 24, respectively, to sources of vacuum.

Figures 8, 9:
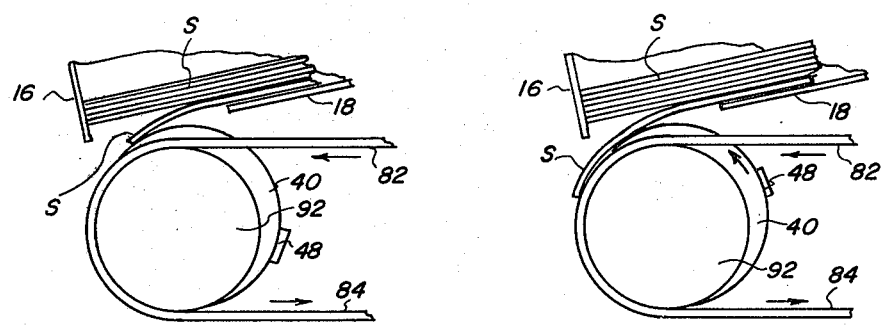
FIGS. 8–10 are fragmentary diagrammatic views illustrating the initial steps in feeding of sheets from a stack of sheets.
Figure 10:
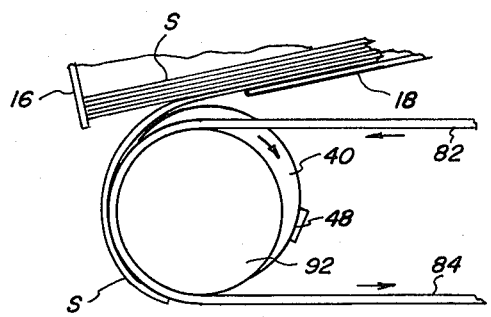

The sheet removing means 22 communicates with passage 60 through a series of slots 70 in tube 54 and slots 72 in sleeves 50 and 52. The slots 70 and 72 are aligned with each other, and the slots 70 communicate with the passage 60. Tube sections 42, 44 and 46 have a series of ports 74, 76 and 78. These ports are located on the tube sections with respect to the slots 70 and 72 so that the tube sections can communicate with the slots, thereby to provide a path for fluid flow from a vacuum source through the slots and through the ports to the exterior surface of the tube sections 42, 44 and 46. The tube sections initially are located at a "rest" position, illustrated in FIGS. 1–5 and 7, wherein ports 74–78 are aligned with slots 70, 72. When the sections are in the "rest" position, a sheet S in tray 16 located immediately above the ports 74–78 is attracted to the tube sections in response to the application of vacuum through the respective slots and ports as shown in FIG. 8. This tacks the sheet to the tube sections with the sheet completely covering ports 74–78 and with the leading edge of the sheet being about ⅛–¼ inch from the edge of the ports. Then the tube is rotated in a counterclockwise direction (as viewed in FIGS. 1, 5, 6 and 8–10) to initiate withdrawal of a sheet S from the tray 16. After the tube sections have rotated about 30°, the leading edge portion of the sheet can be advanced by the sheet transport mechanism as explained later. Accordingly, the vacuum supply to the OVF is interrupted and the tube sections are then rotated in a clockwise direction back to the initial or rest position as illustrated in FIG. 10 of the drawings. After one document sheet has been fully removed from the tray the vacuum supply can again be applied through passage 60, slots 70 and 72 and ports 74–78 to remove the next sheet from the tray.

Referring now to FIGS. 1–3 and 6–10, the sheet transport mechanism 24 comprises a plurality of endless vacuum belts 80 that are located between the tray 16 and platen 12. Each belt 80 has an upper reach 82 and a lower reach 84 which are substantially parallel to each other and disposed in a generally parallel relationship with the platen. The lower reach 84 is immediately above platen 12 and it is separated therefrom by the slot 30. The slot is large enough to allow vacuum to hold a sheet S against the reach 84 of the belts for transport across the platen. Each belt has a multiplicity of small holes 87 therethrough so that a vacuum can be applied to a sheet through the belt holes.

Belts 80 are supported by a cylindrical drive roller 88 which is rotated from a motor 90 shown coupled diagrammatically to the roller in FIG. 1. Belts 80 also are supported by a pair of cylindrical rings 92. One ring is located between the oscillating vacuum tube sections 42 and 44 and the other ring is located between the tube sections 44 and 46. Each ring 92 is rotatably mounted on the tube 54 for rotation about axis 57 by a pair of bearings 94 that are secured to the tube and to the ring. The rings are rotated by the belts when the belts are driven by roller 88. The rings have substantially the same outside diameter as the tube sections 42, 44 and 46. However, the axes 55, 57 of the tube sections and rings are offset as best shown in FIGS. 4–10. Therefore, a sheet to be removed from the tray is first attracted to the portions of the tube sections that project above the rings and the belts 80 supported by the rings as shown in FIG. 8. Then, in response to counterclockwise movement of the tube sections, the sheet is transferred to the belts at the point where the belts travel over the portion of the rings that project to the left beyond the tube sections. This is illustrated in FIG. 9. During this transfer of the sheet from the tube sections to the belts the sheet remains under the control of vacuum from the OVF or the belts so that the sheet does not become skewed. Vacuum to the OVF is interrupted (reduced to zero) at the time in the cycle when the sheet can be advanced by the vacuum belts.

Figure 3:
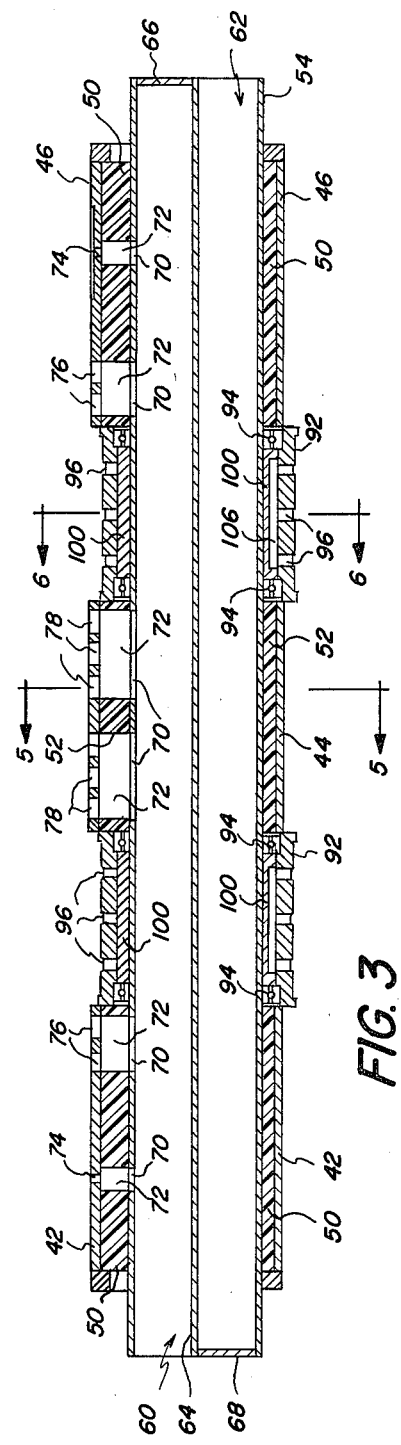
FIG. 3 is a longitudinal cross-section taken along the line 3—3 of FIG. 2.
Figure 6:
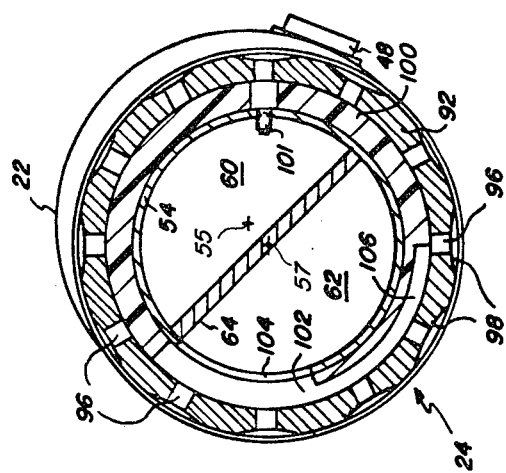
FIGS. 4, 5 and 6 are transverse cross-sections taken along lines 4—4, 5—5, and 6—6, respectively, in FIGS. 2 and 3.

As best shown in FIGS. 2, 3 and 6, each ring 92 has a series of ports 96 that extend entirely through the ring in a radial direction. The ports 96 are arranged in a series of equally spaced circular rows with the ports in any two adjacent rows being circumferentially offset from each other, and with ports in alternate rows being axially aligned with each other. In addition, there is a rectangular area 98 on the outer surface of the ring 92 adjacent to each port 96. Each area 98 is slightly concave and may have a radius of about four inches, for example. As best illustrated in FIG. 2, the entire surface area of each ring around the ports 96 and the area 98 is recessed slightly from the outermost ends of the ring.

Two cylindrical baffles 100 are secured to tube 54 by set screw 101 (FIG. 6). Baffles 100 are located between the tube and the rings 92. Each baffle extends in an axial direction between the pair of bearings 94 that support the respective ring 92. As best illustrated in FIGS. 3 and 6, each baffle 100 has a slot or opening 102 therethrough. In an axial direction the slot is coextensive with the portion of the ring which has the ports 96 therein. As shown in FIG. 6, slot 102 is aligned with a corresponding slot 104 in tube 54 to provide fluid communication from passage 62 in the tube to the ring through the slot or opening 102. A portion 106 of slot 102 extends circumferentially around the outer surface only of the baffle away from that portion of the slot which is aligned with the slot 104. This construction allows a relatively high vacuum (low pressure) to be applied directly through slot 104 and slot 102 to the ports 96 of the ring 92 that are aligned with the slot 104 and slightly less vacuum to be applied to those ports 96 which are aligned with the slot portion 106. Vacuum applied through ports 96 is effective to hold a sheet onto the ring 92 throughout the area of the ring that is aligned with slots 102, 106.

When a sheet S is removed from the tray 16, it is transferred from the sheet removing means 22 to the sheet transport mechanism 24 along a line that is substantially in the plane defined by the partition 64. Vacuum from passage 62 and slot 102 holds the sheet to the belts 80 throughout that portion of the rings which extends in a counterclockwise direction (as viewed in FIG. 6) from the upper left side of the plane through partition 64 to a position about 135° therefrom which is located at the bottom of the ring 92, as viewed in FIG. 6.

Referring now to FIG. 1, a vacuum plenum 110 is defined by a housing 112. The housing is located between the upper and lower reaches 82 and 84 of vacuum belts 80 with the bottom of the housing being immediately above the lower reaches 84 of the belts. The housing 112 is open across its bottom in the area directly over the lower reaches 84 and is otherwise closed. Housing 112 is connected by a conduit 114 to a vacuum source (not shown). Vacuum in plenum 110 operates through the holes in the belts to attract a document sheet to the lower reach 84 of the belts. The vacuum is effective to hold the sheet to the belts essentially from the time that the sheet passes from beneath the rings 92 until the sheet leaves the area beneath the plenum and travels beneath the drive roller 88. As noted previously, the leading edge of the sheet is then delivered into the nip between rollers 36 and 38 and driven through the inverting path 34 for return to the tray 16 where it is received on top of other document sheets remaining in the tray.

Preferably, means are provided for controlling the sheet transport mechanism 24 so that it stops when the trailing edge of the document sheet reaches the registration line 14. This control means comprises a sheet sensor generally designated 116 (FIGS. 1 and 4) which senses the position of the sheet on the sheet transport mechanism 24 and feeds a signal to a logic and control unit (LCU) 118. As is known in the art, LCU's can be used to control the feeder 10 and the associated copier apparatus. The LCU includes a motor control that is effective to stop the motor 90 for the sheet transport mechanism in response to a signal from the sensor 116. The motor control may include a suitable time delay feature which allows movement of the sheet for a period of time after the edge of the sheet is sensed. The motor can be stopped by a brake, or motor 90 can be a stepper motor that is stopped by a signal from the LCU. The sheet sensor 116 illustrated in the drawings comprises a radiation emitter 120 and a detector 122 which are located on opposite sides of the path of a sheet S as it travels around the OVF and the rings 92. The sensor is about 90° from the top of the OVF. It is important that the sheet sensor 116 be accurate because the trailing edge of the sheet should be located precisely with respect to the registration line 14. An emitter-detector type of sheet sensor as illustrated generally will provide a higher degree of accuracy than sheet sensors of the type in which a beam of radiation is reflected to a detector.

As illustrated in FIG. 4, the emitter 120 is secured to a mounting bracket 124 which, in turn, is attached to partition 64. Aligned openings 126, 128 and 130 in tube 54, sleeve 50 and OVF tube section 42, respectively, permit radiation from emitter 120 to pass through these parts and be received by the detector 122. Opening 130 is elongate in the direction of the circumference of the OVF tube section 42 so that during rotation of the tube section some portion of the opening 130 is always aligned with the radiation path between the emitter and the detector. It is apparent from FIG. 4 that the emitter and detector are located on the axis that lies in a horizontal plane passing through the axis 57 of tube 54. Thus the emitter-detector axis extends horizontally and senses the sheet at a point where it is being advanced by sheet transport 24.

The operation of the sheet feeding apparatus will now be described. The machine operator places a document comprising a set of sheets S in tray 16 and sets the associated copier for making the required number of sets of copies of the document in the tray. Sheets S are stacked in the tray in their normal page sequence order, that is, page one is on the top of the stack of sheets, the last page of the document is on the bottom, and the information to be copied faces upwardly on each sheet. When the apparatus is started vacuum is applied through passage 60 to the various sections 42–46 of the oscillating vacuum feeder (OVF) 40 and through ports 74, 76 and 78. At this time these ports are beneath opening 20 in the tray, and the vacuum causes the end portion of the lowermost sheet S in the tray to be attracted to the upper portion of the tube sections which project above the upper reaches 82 of the belts as illustrated in FIG. 8. Vacuum holds the sheet to the tube sections while the tube rotates in a counterclockwise direction, as viewed in FIGS. 1, 5 and 9 of the drawings, to partially remove the sheet from the tray and to feed the leading edge portion thereof through an arc of about 30°. Then vacuum is shut off to the vacuum tube. Vacuum also is being applied through passage 62 and slots 104 and 102 to the ports 96 in rings 92. This vacuum also is applied through the holes or openings 87 in the vacuum belts 80. A document sheet partially removed from the tray by the oscillating vacuum feeder 40 is advanced by the OVF through an arc sufficient to feed the leading edge of the sheet to a point where it is attracted to the vacuum belts as shown in FIG. 9. Then the sheet is fed by the belts entirely out of the tray and partially around the rings 92 as illustrated in FIG. 10. The sheet is delivered by the belts into slot 30 between the lower reaches 84 of the belts and platen 12. This places the sheet under the influence of vacuum applied from plenum 110 through the lower reaches 84 of the vacuum belts so that the sheet is tacked to the belts and advanced across the platen by the belts.

When the trailing edge of the document sheet passes through the beam of radiation emitted by emitter 120, a signal is fed to the logic and control unit 118 by detector 122. After a predetermined time interval the logic and control unit stops motor 90, thereby stopping the roller 88 to brake the sheet transport mechanism 24 with the trailing edge of the sheet located precisely at the registration line 14. After the document sheet is exposed and copied by the associated copier apparatus, motor 90 is started again by the logic and control unit and the document sheet is delivered by the vacuum belts 80, through slot 30, and into the nip of the first pair of drive and idler rollers 36, 38. The pairs of rollers 36, 38 drive the sheet through the inverting sheet path 34 and return the sheet to the tray 16 on top of the other sheets S remaining in the tray.

During the circulation of a sheet it is inverted once as it is fed from the tray 16 to the platen 12 and inverted a second time as it is returned from the platen to the tray, thereby returning the sheet to the tray in the same orientation that it originally occupied in the tray. This cycle is repeated until each document sheet S in the tray has been copied once to produce a single set of copies. The cycle is repeated as many times as required to make the requested number of complete sets of copies.

Referring now to FIG. 1 of the drawings, sheets S also can be fed to the platen 12 for copying by means of a document positioner apparatus generally designated 140. The document positioner 140 comprises a series of drive rollers 142 and idler rollers 144 which are positioned on opposite sides of the sheet path 146. A sheet S is manually advanced along path 146 until it enters the nip between rollers 142 and 144. The sheet is then driven by these rollers to the right toward platen 12 until it reaches a gate 148. The gate is normally held in a position across path 146 by a latch member 150. However, at the appropriate time in the machine cycle the latch member 150 is moved away from the gate to allow rotation of the gate about its axis of rotation 152, thereby allowing the sheet to pass the gate and continue along the sheet path 146. When the gate is moved, the sheet enters the nip between a series of drive rollers 154, that are coaxially mounted with the gate 148, and idler rollers 156 located beneath path 146.

Operation of the drive rollers 142 and 154, together with the respective idler rollers, is effective to drive the sheet toward the platen 12 where it enters the slot 30 between the platen and the lower reaches 84 out of the vacuum belts. As the sheet enters that slot it comes under the influence of vacuum from plenum 110 applied through the vacuum belts 80 so that the sheet then becomes tacked to the vacuum belts for transport across the platen in a manner similar to that previously described in connection with operation of the recirculating feeder.

A sheet sensor 157 is located along path 146 between the gate and sheet transport 24. Sensor 157 comprises an emitter 159 and a detector 161, the detector being coupled to LCU 118 to provide a signal to the LCU. Sensor 157 detects the trailing end of the sheet and signals the LCU, which stops the sheet for registration at the registration line 14 in the manner previously described for sensor 116. After copying, the vacuum belts 80 advance the sheet through slot 30 and to the first pair of drive and idler rollers 36, 38. At that time the LCU positions a diverter 158 in the position illustrated in dotted lines so that the diverter deflects the document sheet away from sheet path 34 and into a sheet path 160. The sheets can then be retrieved by the operator. The operation of the machine continues until the number of copies requested by the machine operator have been produced.

The combination of a recirculating document feeder and a document positioner is disclosed in the before-mentioned U.S. Pat. No. 4,176,945. The document positioner apparatus can be the same or similar to that illustrated in more detail in that patent. In addition, the document positioner can be constructed in the manner disclosed in the commonly assigned U.S. Pat. No. 4,019,732 entitled SHEET REGISTRATION MECHANISM which issued on Apr. 26, 1977 in the name of C. E. Hunt, Jr. et al.

Figure 11:
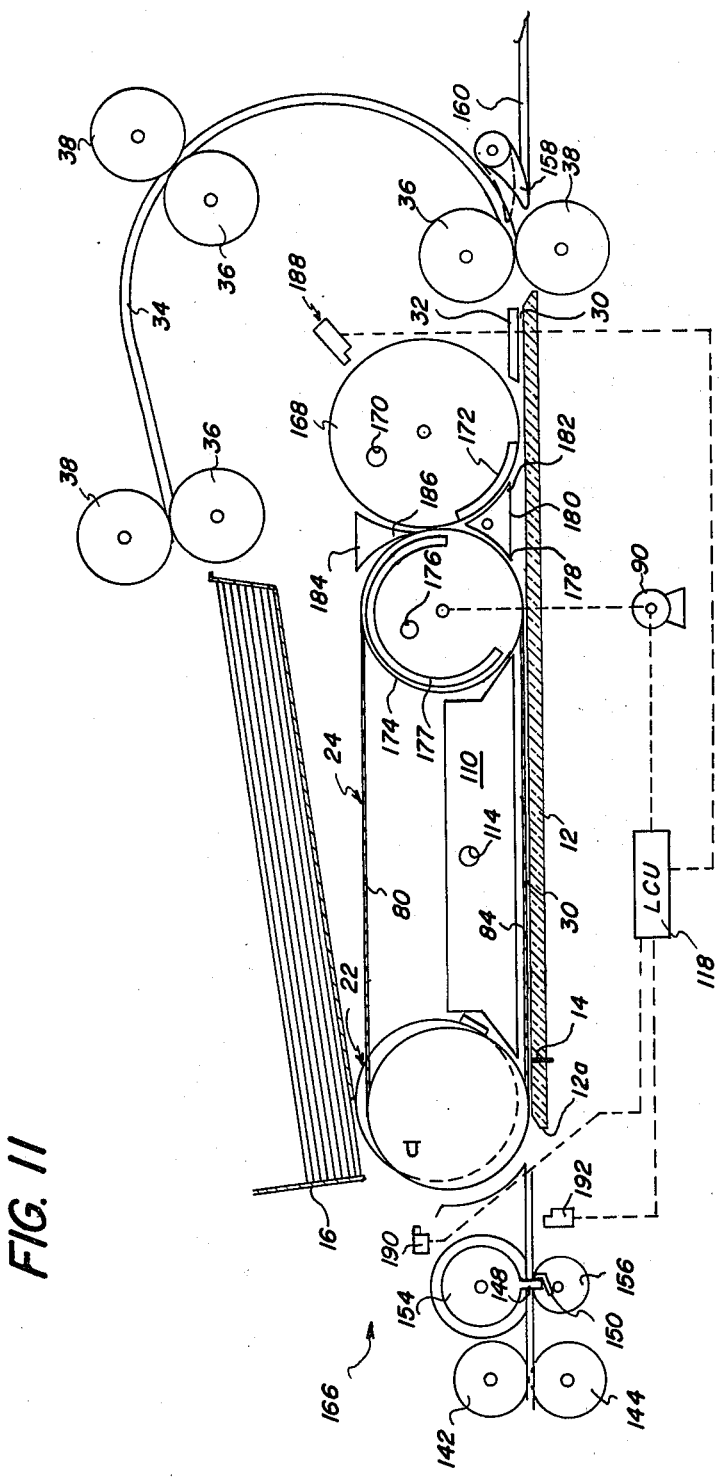
FIG. 11 is a view similar to FIG. 1 illustrating a modified sheet feeding apparatus of the invention for feeding either simplex or duplex document sheets.

FIG. 11 of the drawings illustrates a modification of the invention which enables copying of information on one side or both sides of a document sheet. Document sheets S having information on both sides to be copied are referred to as "duplex" document sheets. The sheet feeding apparatus 166 illustrated in FIG. 11 is similar to the sheet feeding apparatus 10 previously described. Accordingly, the same reference characters have been used to indicate the same or similar parts in FIG. 11.

In order to copy both sides of document sheets the feeder is provided with a sheet turnover device. In the preferred embodiment illustrated in the drawings the turnover device comprises a vacuum turnover drum 168 which is located at the end portion of the sheet transport mechanism 24 opposite from the sheet removing means 22. Turnover drum 168 also is located above platen 12, and beneath the tray 16 and the upper portion of the inverting path 34.

Turnover drum 168 can be of conventional construction. The interior of the drum is connected to a vacuum source through an opening shown at 170 at one end of the drum. The drum has ports therethrough throughout its periphery so that ordinarily a vacuum can be applied through those ports to the exterior surface of the drum, thereby to hold a document sheet onto the drum during its rotation. However, a baffle 172 positioned inside the drum blocks the application of vacuum to a small quadrant or portion of the drum. The baffle illustrated leaves approximately 320° of the drum free for the application of vacuum.

A drive roller 174 of the sheet transport mechanism is similar to the drive roller 88 of FIG. 1 except that a vacuum is applied to the interior of the roller through an inlet port or opening 176, and the roller has a plurality of radially extending openings therethrough so that vacuum can be applied through the openings to the exterior surface of the roller. A baffle 177 covers about 270° around the interior of the roller 174 so that vacuum is applied only to about 90° of the exterior surface of the roller. This 90° area extends in a counterclockwise direction from closely adjacent to the vacuum plenum 110 to a position immediately adjacent to the turnover drum 168. Thus a document sheet carried by the lower reaches 84 of the belts 80 is delivered to the roller 174 and then held by vacuum against the roller during rotation of the roller through about 90°, thereby to deliver the document sheet to that portion of the turnover drum that is immediately clockwise of the baffle 172. The vacuum applied through the turnover drum 168 holds the document sheet to the turnover drum as it rotates through about 270°, thereby to deliver the document sheet back into the slot 30 between the backing plate 32 and the platen 12 and with the leading edge of the document sheet being moved in the opposite direction across the platen, that is, from right-to-left instead of left-to-right (as viewed in FIG. 11).

The document sheets are deflected upwardly from space 30 onto the outer surface of drive roller 174 by a finger 178 of a stripper-diverter 180. After the sheet has traveled around the turnover drum, the stripper-diverter 180 is moved to a second position, counterclockwise from the position illustrated, where a second finger 182 is effective to strip the sheet from the turnover drum 168 and guide it into the slot 30. The lower surface of the stripper-diverter 180 helps guide the sheet as it travels to the left toward the sheet transport 24. Finger 178 of stripper 180 also can be positioned for guiding a sheet directly through slot 30 beneath roller 174 for copying of simplex document sheets as explained later.

A stripper 184 located between the roller 174 and the turnover drum 168 has a finger 186 which strips the document sheet from the roller 174 and directs it onto the turnover drum 168. The feeder 166 utilizes a reversible drive motor 90 for the sheet transport 24 so that a sheet inverted by the turnover drum 168 and fed back onto the platen can again be transported by the sheet transport 24 in a right-to-left direction across the platen as well as for movement of document sheets in a left-to-right direction upon command of the LCU 118.

A sheet sensor 188 is provided adjacent to turnover drum 168 for detecting the movement of the sheet about the turnover drum. Sheet sensor 188 can be the same or similar to the sheet sensor 116 previously described. It is coupled to the LCU 118 to provide a signal to the LCU for controlling the operation of the apparatus in the manner described hereinafter. Similarly, sheet sensors 190 and 192 are provided for sensing the location of document sheets. Sensor 190 detects a sheet as it passes around the left side of the sheet transport at the rings 92, and sensor 192 detects the sheet at the point where document sheets are being fed along the document positioner apparatus toward the platen 12.

Figure 12:
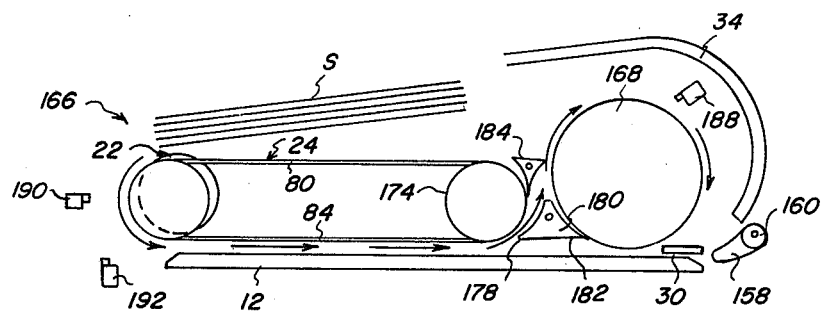
FIGS. 12–14 are diagrammatic views illustrating the operation of the FIG. 11 apparatus.
Figure 13:
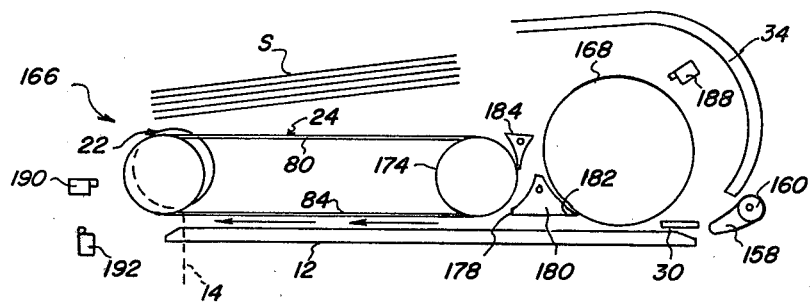
Figure 14:
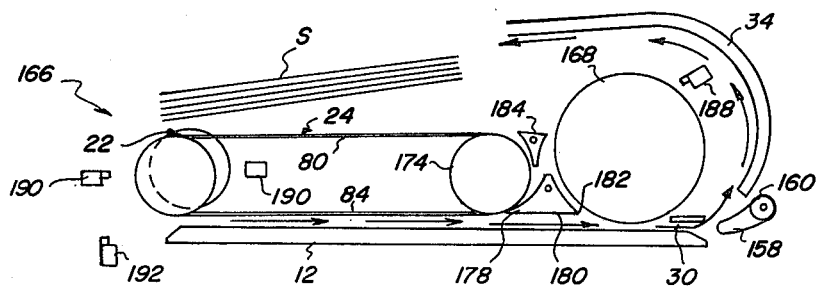

FIGS. 12-14 illustrate diagrammatically the operation of the sheet feeding apparatus 166. Referring initially to FIG. 12, a stack of duplex document sheets S are placed in the apparatus in their normal orientation and page sequence order, that is, the sheets are in their normal page sequence order and the top sheet of the stack of sheets contains page one of the information to be copied. The odd-numbered pages face upwardly, and the even-numbered pages face downwardly. When operation of the machine is initiated, the sheet removing means 22 partially withdraws the lowermost sheet S from the stack and feeds it to the sheet transport mechanism 24. Sheet transport 24 then moves the sheet as shown by the arrows in FIG. 12 along the lower reach 84 of the belt and above the platen 12 without stopping the sheet. This part of the operation is similar to that described previously for feeder 10. At this time vacuum is being applied to drive roller 174, and the stripper-diverter 180 is tilted counterclockwise, as shown in FIG. 12, so that the document sheet is stripped from platen 12 and carried partway around the drive roller 174. The vacuum applied through drive roller 174 becomes ineffective to hold the sheet against the drive roller at the point where the sheet reaches the area covered by the baffle 177. As the document sheet leaves the area where vacuum holds it on roller 174, it engages stripper 184 and is deflected toward the vacuum drum 168. Vacuum drum 168 holds the sheet against the drum during rotation of the sheet and the drum through about 270°. At that point the finger 182 of the stripper-diverter 180 is effective to separate the sheet from the vacuum drum and direct it back toward the platen 12 and into the slot 30 between the lower reach 84 of the belt and the platen 12.

Progress of the document sheet along the path described is detected by the sheet sensors 190 and 188. At the appropriate time in the machine cycle, as determined by the detection of the sheet location by the sheet sensors, sheet transport mechanism 24 is reversed, as illustrated in FIG. 13, so that the document sheet, after traveling around the turnover drum 168 and being returned to the platen, is again picked up by the vacuum belts 80 and advanced across the platen 12. At this time the sheet travels in a right-to-left direction (as viewed in the drawings) instead of in the opposite direction as previously described. Signals fed to the LCU 118 by sheet sensors 190 and 188 are used to enable the LCU to stop the motor 90 to effect braking of the sheet transport mechanism 24 at the appropriate time to stop the document sheet with its leading edge located precisely at the registration line 14. Then the sheet is exposed and copied by the associated copying apparatus in a conventional manner. When the document sheet is first stopped at the registration line, it has been inverted twice since leaving the stack of sheets in the tray 16, that is, it is inverted once as it is initially fed from the tray around the left end of the sheet transport mechanism 24 and onto the platen 12, and then it is inverted a second time as it travels around the inverting drum 168 and before it is returned to the platen 12 for copying. This inversion of the document sheet twice before being stopped at the registration line 14 for the first copying of the sheet results in the bottom side of the bottommost sheet being presented for exposure first. This is the last (even-numbered) page of the document set in the tray 16. After that first side of the document sheet has been exposed, the sheet transport mechanism 24 is again started and driven in its original direction as illustrated in FIG. 12. This removes the sheet from the platen 12, transports the sheet around the inverting drum 168, and then returns the sheet to the registration line 14 on the platen 12 as shown in FIGS. 12 and 13. This effects a single inversion of the document sheet so that the second (odd-numbered) side thereof is then presented for exposure and copying. The side of the sheet exposed and copied the second time comprises the side of the sheet that initially faced upwardly in the tray 16.

After the second side of the sheet has been exposed for copying the sheet is returned to the tray 16 in the manner illustrated in FIG. 14. More specifically, the sheet transport mechanism 24 is operated to move the document sheets to the right across platen 12. At this time the vacuum is shut off to drive roller 174 and turn over roller 168, and the stripper-diverter 180 is positioned as illustrated in FIG. 14 so that the finger 178 thereof is effective to separate the document sheet from the belts 80 as the belts travel around the drum 174, thereby deflecting the sheet beneath the stripper-diverter 180. The sheet then travels through the slot 30 between the backing plate 32 and the platen 12. As it leaves this slot the diverter 158 is positioned in its lowermost position so that the sheet is deflected into the sheet inverting path 34. The sheet is driven by rollers 36, 38 through path 34 and returned to the tray 16. This inverts the sheet one more time, making a total of four inversions of the sheet, so that the sheet is returned onto the stack of sheets in tray 16 with the same side of the sheet facing upwardly that originally faced upwardly. The sheet is delivered onto the top of the other sheets S remaining in the tray. Thus the sheets are copied in an inverse page and sheet order.

The sheet feeding apparatus 166 can also be used for copying simplex document sheets in a manner similar to that previously described in connection with the apparatus designated 10. More specifically, referring to FIG. 14, a simplex document sheet S is fed from the tray by the sheet removing means 22 and delivered to the platen by the sheet transport mechanism 24. As the sheet is removed it is detected by the sheet sensor 190 and the mechanism 24 is stopped when the trailing edge of the sheet reaches registration line 14. After exposure the mechanism 24 is again started and the sheet is driven beneath the stripper-diverter 180 and into the sheet inverting path 34 for return to the tray on top of the other sheets in the tray.

The recirculating feeder apparatus 166 has a document positioner structure shown associated therewith which operates in essentially the same manner described hereinbefore in connection with FIGS. 1-10. Sheet sensor 192 detects a sheet as it is fed into the document positioner. In response to a signal received from sensor 192, the LCU 118 adjusts the position of diverters 180 and 159 and otherwise controls operation of the apparatus.

A number of advantages are achieved by the apparatus of the present invention. For example, in some prior art devices a plurality of drive rollers engage document sheets to drive the sheets in the path from the tray holding the document sheets to a registration position on the platen. Such rollers may induce skewing of the document sheets as they travel along the path to the registration position. The present apparatus eliminates these nip rollers in the path between the tray and the registration position and thereby eliminates the skewing resulting from such rollers. This results from the positive control effect by vacuum transport of the document sheet from the hopper to the exposure position throughout the entire path of travel of the sheet. In this regard, any skew that may be induced in the sheets by the pairs of rollers 36, 38 is not significant because when the sheet is returned to the tray 16 it is properly aligned with other sheets by side and end joggers, not shown. Moreover, a shorter paper path is provided between the tray and the exposure or registration position then with some prior devices. This minimizes the likelihood of the sheet becoming skewed, and additionally reduces the time required for delivering the sheet to the registration position. In addition, some prior apparatus require registration feet at the registration position, and the document sheet is driven against such registration feet in order to properly align the sheet prior to exposure. Such feet are eliminated by the present construction. Instead, the sheet sensors detect the trailing edge of the sheet and stop the sheet transport 24 at a position where the edge of the sheet is properly aligned at the registration line. Finally, with some prior art devices a "black line" is produced on copy sheets at some magnifications due to copying of the registration bar or feet. This is eliminated by elimination of the feet or bars themselves.

Although the invention has been described in connection with preferred embodiments thereof, it will be understood that variations and modifications can be effected within the spirit and scope of the invention as described hereinabove and as defined in the appended claims.

I claim:
1. Sheet feeding apparatus for feeding sheets seriatim from a stack of sheets in a tray or the like, the apparatus comprising:
   an oscillating vacuum tube located adjacent the tray, the tube having a plurality of ports extending through the outer surface of the tube and having means for applying a vacuum to the ports so that a sheet in the tray can be tacked to the tube surface by vacuum and partially removed from the tray upon oscillation of the tube, the tube comprising a plurality of spaced tube sections and means interconnecting the sections for effecting conjoint oscillating movement of the sections about an axis;
   at least one endless vacuum belt having a plurality of openings therethrough, a portion of the belt being disposed between two adjacent sections of the vacuum tube;
   means for applying a vacuum through openings in the belt; and
   means supporting the belt for movement along an endless path, the supporting means locating the belt relative to two adjacent sections of the tube so that the path traveled by the belt extends between the tube sections and is recessed beneath the tube surface at the portion of the tube sections nearest the tray and the belt path then projects from the tube sections and above the tube surface, whereby a sheet removed from the tray by the tube is transferred to the belt upon oscillation of the tube.

2. The invention as set forth in claim 1 wherein the supporting means comprises a ring located between the tube sections and rotatable about an axis offset from the axis of the tube sections, and means for applying a vacuum through the ring to the belt so that a sheet transferred to the belt can be tacked to the belt by vacuum.

3. The invention as set forth in claim 2 wherein the supporting means further comprises a support tube extending through the oscillating vacuum tube sections and the rings, means mounting the oscillating vacuum tube sections and the ring on the support tube, and means defining separate vacuum passages through the support tube to the oscillating vacuum tube sections and the ring.

4. Sheet feeding apparatus for feeding sheets seriatim from a stack of sheets, the apparatus comprising;
   a tray for receiving a stack of sheets, the tray having an opening through which a sheet can be removed from the stack;
   means for removing a sheet from the tray, the removing means comprising a vacuum tube mounted for movement about an axis, the vacuum tube being located adjacent the opening in the tray so that a sheet in the tray is attracted to the tube when the tube is connected to a source of vacuum, the tube comprising three axially-spaced tube sections jointly movable about the axis of the tube; and
   a vacuum belt sheet transport comprising two endless vacuum belts having openings therethrough and means supporting the belts for movement along a path, the belt supporting means comprising two cylindrical members rotatably about an axis offset from the axis of the vacuum tube, the cylindrical members having a plurality of ports therethrough for applying a vacuum to the belts through the ports, one of the cylindrical members being located between a first and a second vacuum tube section and the other of the cylindrical members being located between the second vacuum tube section and a third vacuum tube section, and the cylindrical members being located relative to the vacuum tube sections so that the belts (i) are recessed from the portions of the tube sections nearest to the tray and (ii) project beyond the surface of other portions of the tube sections whereby the belts are in a position to receive a sheet removed from the tray by the vacuum tube.

5. In a recirculating sheet feeding apparatus for feeding document sheets seriatim from a stack of such sheets in a tray along a closed-loop path that extends from the tray to a registration position on a platen where the sheets can be copied and then extends back to the tray, the sheets when in the registration position having an edge located along a line adjacent to one edge of the platen, the improvement comprising;

a sheet transport mechanism located above the platen and adapted to engage and advance a document sheet across the platen in a direction extending away from the one edge of the platen so that the trailing edge of the sheet reaches the one edge of the platen after the leading edge of the sheet;

means for stopping the sheet transport mechanism when the sheet reaches the registration position with the trailing edge of the sheet located at the line adjacent to the one edge of the platen;

sheet removing means located adjacent to the tray and the sheet transport mechanism, the sheet removing means being effective to remove a sheet from the tray and feed it to the sheet transport mechanism so that the trailing edge of the sheet removed from the tray comprises the edge of the sheet to be located at the registration edge of the platen;

means for removing sheets from the platen after copying and for delivering each sheet back to the tray in the same orientation and relative position the sheet occupied prior to its removal from the tray;

the stopping means comprises a sheet sensor located with respect to the sheet removing means and sheet transport mechanism for detecting the trailing edge of a sheet that has been removed from the tray by the sheet removing means and is being delivered onto the platen by the sheet transport mechanism; and means coupled to the sheet transport mechanism and responsive to the detection of the trailing edge of a sheet by the sensor to stop such mechanism after the trailing edge of the document sheet has traveled a predetermined distance along the path so that the mechanism is stopped with the trailing edge of the document sheet located at the line adjacent to the one edge of the platen.

6. The invention as set forth in claim 5 further comprising a sheet inverter located relative to the sheet transport mechanism to receive a sheet from the mechanism, the sheet inverter being effective to invert a document sheet and return the document sheet to the sheet transport mechanism, and means for reversing the sheet transport mechanism so that an inverted sheet can be transported by such mechansim across the platen and toward the registration position.

7. The invention as set forth in claim 6 further comprising sheet sensor means for sensing the location of a document sheet, and means responsive to the sensing of a sheet by the sensor means for reversing the sheet transport mechanism.

8. In a recirculating sheet feeding apparatus for feeding document sheets from a stack to an exposure platen of a copier and back to the stack, the document sheets being located at a registration position on the platen for copying, and the apparatus having a tray spaced from the platen for holding the stack of document sheets so that the sheets can be removed, one-at-a-time, and fed seriatim to the platen, the improvement comprising:

sheet removing means comprising an oscillating vacuum feeder having a plurality of spaced sections jointly movable in two directions about an axis, said sections having ports therethrough, the sheet removing means having means for connecting said ports to a source of vacuum, the sections being located with respect to the tray so that a sheet in the tray is attracted to the sections when the port are connected to a vacuum source;

a sheet transport mechanism for receiving a sheet from the sheet removing means and delivering the sheet to the platen for copying, the transport mechanism comprising at least one vacuum belt that extends between two sections of the vacuum feeder and over the platen, and means for applying a vaccum through the belt to hold a sheet to the belt as the belt travels from the feeder to the registration position on the platen, the vacuum belt being effective to at least partially remove a sheet from the registration position;

means adjacent the sheet transport mechanism for receiving a sheet from the sheet transport mechanism and for returning the sheet to the tray;

a logic and control unit coupled to the transport mechanism for controlling operation of the transport mechanism; and sensing means coupled to the logic and control unit for detecting the trailing edge of a sheet as the sheet travels between the tray and the platen, the logic and control unit being responsive to the sensing of the trailing edge of a sheet by the sensing means to stop the transport mechanism when the sheet trailing edge reaches the registration position.

9. The invention as set forth in claim 8 further comprising a tube for supporting the oscillating vacuum feeder, means eccentrically mounting the vacuum tube sections on the tube, and a rotatable ring concentrically mounted on the tube between two sections of the feeder for supporting said vacuum belt relative to the feeder sections.

10. The invention as set forth in claim 9 further comprising means dividing the tube into two fluid passages, and means providing fluid communication (i) from one of the passages to the ports of the vacuum tube sections and (ii) from the other passage to the vaccum belt through the ring.

11. The invention as set forth in claim 8 further comprising means defining a sheet path along which a document sheet can be fed to the vacuum belt of the sheet transport mechanism at a location between the sheet removing means and the platen, drive means for feeding a sheet along the path to the sheet transport mechanism so that the transport mechanism can then deliver the sheet to the platen, and means defining a second sheet path having an end portion adjacent the sheet returning means, and a diverter from deflecting a document sheet either into the sheet returning means or into the second sheet path.

12. The invention as set forth in claim 8 futher comprising a sheet turnover device located between the sheet transport mechanism and the sheet returning means, and diverter means for (i) selectively deflecting a document sheet to the turnover device after the sheet has passed the registration position on the platen and (ii) directing the sheet back toward the registration position, thereby to invert the document sheet.

13. The invention as set forth in claim 12 further comprising reversible drive means coupled to the vacuum belt for driving the belt over the platen in two opposite directions, a programmed logic and control unit for controlling the drive means for the vacuum belt, and sensing means coupled to the logic and control unit and located along the path of travel of a document sheet for detecting the location of the document sheet, the logic and control unit responsive to the detection of a sheet by the sensing means for controlling the drive means to effect advancement of a document sheet in one direction over the platen and toward the turnover device and in a second direction to return a sheet from the turnover device to the exposure position.

* * * * *